May 19, 1953  A. C. KRACKLAUER  2,639,251
PRODUCTION OF FILTER UNITS FOR A FILTER APPARATUS
Filed March 21, 1950
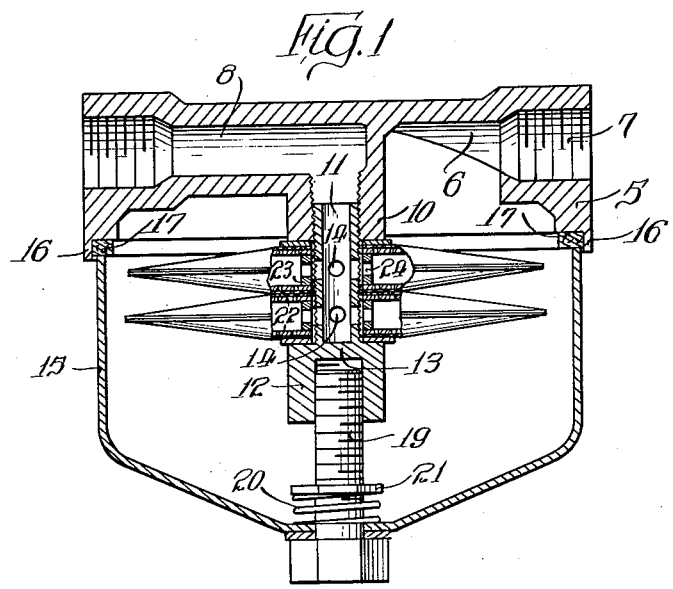
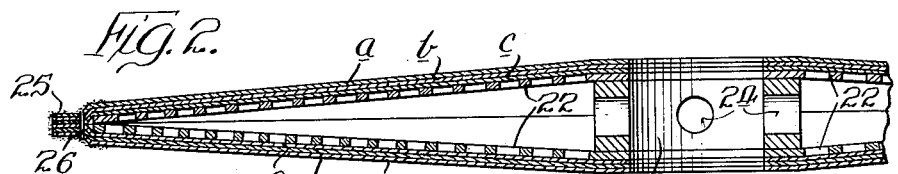
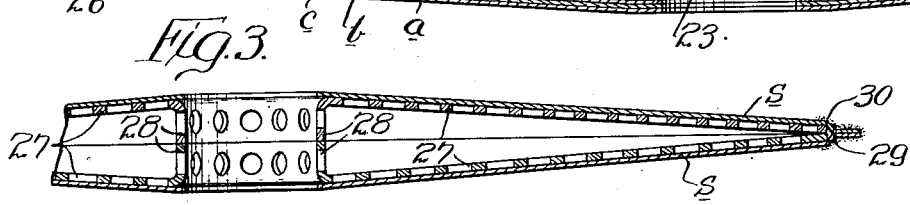
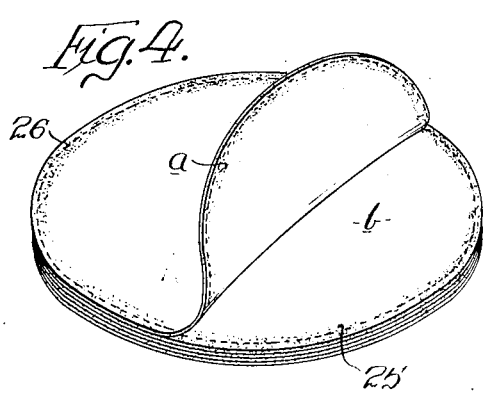
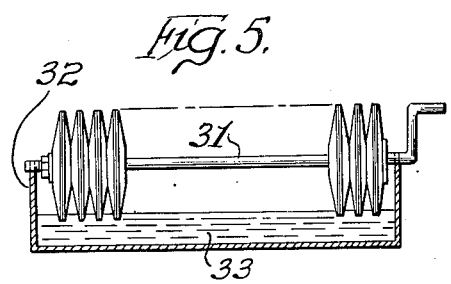
INVENTOR.
Aloysius C. Kracklauer
BY
Banning & Banning
Attys Patented May 19, 1953

2,639,251

UNITED STATES PATENT OFFICE 2,639,251

PRODUCTION OF FILTER UNITS FOR A FILTER APPARATUS

Aloysius C. Kracklauer, Mundelein, Ill.

Application March 21, 1950, Serial No. 150,927

2 Claims. (Cl. 154—81)

1

This invention relates to a filter apparatus for separating solid particles and other matter out from oils and various liquids. It is designed primarily for industrial use although it may also be found advantageous in certain domestic installations.

For its objects this invention aims to provide a simple form of apparatus making use of a plurality of filter units each in the form of a hollow, cone-shaped support to whose opposite faces are applied thin sheets of a filtering medium, such as filter paper. Such a support may be produced at small expense, and, together with its associated filtering media, may be accordingly replaced as often as necessary or desirable without involvement of appreciable cost.

In the accompanying drawing a suggestive embodiment of my invention is illustrated in the manner following:

Figure 1 is a vertical sectional view through the filter apparatus in its entirety;

Fig. 2 is an enlarged fragmentary vertical section, taken centrally through one of the filter units;

Fig. 3, which is a view similar to Fig. 2, shows a filter unit of modified construction; and Fig. 4 is a perspective view of a filter unit from which an outermost sheet of the multi-ply filtering medium is partly detached to exhibit the next succeeding ply.

Referring now to Fig. 1, there is here shown a cover 5 on whose under side is a downwardly facing channel 6 leading into a threaded inlet port 7 to which may be connected a supply pipe (not shown). An outlet port 8 which is extended laterally out of the cover may be arranged opposite the inlet. At its inner end the outlet communicates with a hollow base in the form of an axial boss 10 open at its bottom end and interiorly threaded to interengage with a threaded sleeve 11 constituting a post which upstands from a hollow head 12 that is open on its under side. A cross wall 13 separates the interiors of the post and head. Lateral ports 14 are provided through the walls of the post to establish communication with the several filter units that are adapted to be assembled thereon.

A casing 15 whereon the cover 5 is fitted is also provided. The cover is formed with a depending marginal flange 16 in closely surrounding relation to the upper edge of the casing, and adjacent thereto is a flattened portion seating a gasket 17 which receives engagement from the top edge of the casing. A bolt having a threaded shank 19 is extended through an axial opening in the

2 casing bottom to engage with the threaded post head 12 thereabove and, when rotatively advanced therein, to draw the cover down tightly, and hold it so, upon the casing top. A spring 20 which is coiled around the bolt shank 19 exerts opposite thrusts against the casing and a nut 21 which is adjustably carried on the bolt. By this means a sufficient friction is maintained upon the bolt to prevent reverse rotative movement thereof except in response to a very substantial turning force such as may be applied only with a proper tool.

A filter apparatus of this general description is adapted for operation with one or more filter units such as are shown in detail in Figs. 2–4. I employ in each such unit a pair of coned foraminous supporting discs 22 arranged face to face with their marginal portions interengaged and with an axial spacer means therebetween. According to Fig. 2 the spacer consists of a separate ring 23 interposed between the discs centrally thereof. Each disc is centrally apertured for fitting upon the post 11 whose lateral ports 14 then register with other ports 24 formed oppositely thereto in the associated ring. Over the outer face of each disc is positioned a filtering medium which may comprise one (as in Fig. 3) or a stack (as in Fig. 2) of circular filter paper sheets a, b, c, etc., each apertured at its center and having a diameter slightly in excess of the supporting discs 22. The marginal portions of the several filtering sheets will protrude beyond the margins of the two discs 22 (see Fig 2) a distance sufficient for the converging sheets to interengage. When so assembled, the marginal portions of the several sheets may be cemented as at 25 together by a suitable adhesive which is spread between their contacting faces and over their peripheral edges to provide a seal therefor. Such an adhesive interconnection may be supplemented or replaced by stitching and/or stapling at 26 along a circular line which lies slightly beyond the margins of the supporting discs 22.

There is also illustrated in Fig. 3 a filter unit in which the axial spacer ring is dispensed with. Instead, each coned foraminous supporting disc 27 is flanged inwardly at 28 and extended toward the other to meet in edge-to-edge relation in a medial plane. By this means I provide a central aperture through which a hollow supporting post may be fitted, as already described in connection with Figs. 1 and 2. In Fig. 3 there is also shown a single sheet of filter paper s applied over the exposed face of each disc 27, the marginal portions of the two sheets being extended beyond the margins of the discs for interconnection as by a circular line of stitching or stapling 29. In addition, the marginal portions of the two sheets are desirably cemented together as at 30 by a suitable adhesive which is spread between their contacting faces and over their peripheral edges to provide a seal therefor. In this construction the interengaging flanges 28 maintain the discs in spaced relation to provide therebetween a chamber through which the filtered fluid moves inwardly in its advance through the circuit which leads to the outlet port of the filter casing.

In applying the adhesive to the marginal portions of the filtering sheets it is advantageous first to complete assembly of the filter units a number of which are then mounted on a horizontal spindle 31 to be rotated above a pan 32 containing a liquid bath 33 of the adhesive. The adhesive is desirably non-soluble in water or oil or other liquid which is to be circulated through the filter. The lowermost portions of the filtering sheets, while held closely together, are submerged slightly within the adhesive bath 33, perhaps ⅛". This amount of dip, plus the slow speed of rotation of the filter units, is adequate to transfer to the marginal portion of the several paper sheets $a$, $b$, $c$, etc., a coating which is peripherally continuous so as to cement these sheets together and also to provide a seal exteriorly thereof. Application of the adhesive in this manner is equally advantageous even when the filtering sheets have by a prior operation been interconnected by stitching or stapling along a circular line, since the adhesive is readily absorbed into these sheets to penetrate thereinto in their marginal portions for interconnection thereof.

In operation, the liquid to be filtered enters at the inlet 7 to fill the chamber within the casing and then establish a circuit therethrough to the outlet via the several filter units and the axial passageway interiorly of the post 11. In this circulatory movement the liquid is required to pass through the filtering media incorporated into the filter units, and in so doing particles and foreign matter are separated out to remain thereon as a residue. In time the discs should be replaced with others that are fresh or, if multi-ply filtering media be employed, as shown in Figs. 2 and 4, the outermost sheets may be removed from each stack to expose the still-fresh sheets thereunder. When done, and filtering is resumed, the operation will proceed the same as when first started with fresh filtering media. By using such multi-ply filtering media it is unnecessary to maintain on hand a stock of individual circular sheets for replacement purposes, requiring for their installation a complete disassembly and then assembly of the affected filter units.

It is to be noted also that the cone discs and enclosing filtering sheets, as illustrated in Figs. 2 and 4, make use of a connection, such as an adhesive or stitching or both, which joins the filtering sheets marginally at a point beyond the cone discs. Such a retaining means is simple, inexpensive, and well adapted for permitting separation of one sheet from the remainder wherever a fresh filtering medium is desired. When such separation does take place, the remaining sheets remain intact in their interconnection with each other, so that proper and dependable filtering therethrough may continue as theretofore.

This case is a continuation-in-part of my application filed November 30, 1949, Serial No. 130,251.

I claim:

1. In the production of a filter unit which comprises filtering sheets applied over opposite faces of a hollow foraminous disc and extended outwardly beyond the periphery thereof, the method of interconnecting and sealing the sheets adjacent their peripheral portions which comprises first assembling the filter sheets in place upon the disc, in then securing the sheets together at points outwardly of each disc periphery, in assembling in coaxial unitary relation a plurality of such discs with secured sheets applied thereto for rotation about a horizontal axis, and in slowly rotating the assembled discs and sheets as a unit above an adhesive bath with only the lowermost portions of the filter sheets on each disc dipped thereinto to thereby unite the peripheral portions of the sheets and simultaneously apply a sealing coat thereover.

2. In the production of a filter unit which comprises filtering sheets applied over opposite faces of a hollow foraminous disc and extended outwardly beyond the periphery thereof, the method of interconnecting and sealing the sheets adjacent their peripheral portions which comprises first assembling the filter sheets in place upon the disc, in assembling in coaxial unitary relation a plurality of such discs with the sheets applied thereto for rotation about a horizontal axis, and in slowly rotating the assembled discs and sheets as a unit above an adhesive bath with only the lowermost portions of the filter sheets on each disc dipped thereinto to thereby unite the peripheral portions of the sheets and simultaneously apply a sealing coat thereover.

ALOYSIUS C. KRACKLAUER.

References Cited in the file of this patent

UNITED STATES PATENTS

| Number | Name | Date |
|---|---|---|
| 1,744,510 | Hele-Shaw et al. | Jan. 21, 1930 |
| 2,103,572 | Wells | Dec. 28, 1937 |
| 2,304,618 | Williams | Dec. 8, 1942 |
| 2,392,354 | Alsop | Jan. 8, 1946 |
| 2,405,675 | Southwick et al. | Aug. 13, 1946 |
| 2,435,115 | Alsop | Jan. 27, 1948 |
| 2,495,761 | Platt | Jan. 31, 1950 |
| 2,507,126 | Townsend | May 9, 1950 |
| 2,521,984 | Lang | Sept. 12, 1950 |